W. ROSE.
PACKETING APPARATUS.
APPLICATION FILED NOV. 14, 1913.

1,163,465.

Patented Dec. 7, 1915.
11 SHEETS—SHEET 1.

Fig. 1.

WITNESSES
R. H. Grote
M. E. Keis

INVENTOR
William Rose
BY
Howson and Howson
his ATTORNEYS

W. ROSE.
PACKETING APPARATUS.
APPLICATION FILED NOV. 14, 1913.

1,163,465.

Patented Dec. 7, 1915.
11 SHEETS—SHEET 9.

WITNESSES

INVENTOR
William Rose
BY
ATTORNEYS

W. ROSE.
PACKETING APPARATUS.
APPLICATION FILED NOV. 14, 1913.

1,163,465.

Patented Dec. 7, 1915.
11 SHEETS—SHEET 10.

WITNESSES
L. H. Grote
W. E. Keir

INVENTOR
William Rose
BY
Howson and Howson
his ATTORNEYS

UNITED STATES PATENT OFFICE.

WILLIAM ROSE, OF GAINSBOROUGH, ENGLAND.

PACKETING APPARATUS.

1,163,465.  Specification of Letters Patent.  Patented Dec. 7, 1915.

Original application filed December 10, 1912, Serial No. 735,902. Divided and this application filed November 14, 1913. Serial No. 801,035.

*To all whom it may concern:*

Be it known that I, WILLIAM ROSE, a subject of the King of Great Britain, residing at Albion Works, Gainsborough, in the county of Lincoln, England, have invented new and useful Improvements in Packeting Apparatus, of which the following is a specification.

This invention relates to apparatus for packeting tea, tobacco, or other materials, and the said invention has for its object to provide improved folding mechanism and also mechanism by means of which a more or less, rapid vibratory motion can be imparted to the bags, or containers, (which, for brevity, I will presume to be paper bags) while material is being supplied to them, not only while the bags are stationary, but also while the bags are being filled and are being carried around by the intermittently rotating body.

The present application is a division of my copending application 735,902, filed December 10, 1912.

In some machines of this class as hitherto constructed, a more, or less, rapid vibratory motion has been imparted to the boxes after material has been supplied to them, or to the boxes or receptacles, in which the said bags are held. This vibratory motion has been necessary to cause the contents of the bags to settle down so that each of the packets may be of a certain predetermined size when completed.

In some cases a plunger, or ram, or plungers, or rams, have been caused to descend onto, and firmly compress, the contents of the bags into the desired space and a rod, or arm, or rods, or arms, with suitably shaped ends, has, or have, been employed to assist the plungers, or rams.

When certain materials, for instance tea, or coarsely granulated substances, have been operated upon in this manner, the said material has been damaged by the plungers, or rams, breaking the leaves, or granules, of the said material.

In some machines jointed levers, or arms, and spindles have been employed for imparting the said vibratory motion, the said arms, or spindles, having secured to them plates, or disks, of approximately the same area as, or of less area than, the bottom of the bags, and these plates, or disks, have been caused to strike, or tap, the sides, or bottom, of the bag.

The aforesaid vibrating motion has, in machines of this class, been heretofore imparted to the bags while the bags are in one of their positions of rest or when the bag is moving from one filling station to another, but according to this invention means are provided whereby suitable vibrating motion is imparted to the said bags, not only during the time the intermittently rotating body is stationary, but also during the time the bags are filling and while the intermittently rotating body is making a partial rotation, or partial rotations, so that there is a continuance of such vibrations until the partially charged or charged bags have passed their vibrating stages, which may comprise one, or more, positions in which the intermittently rotating body makes a stoppage and a partial rotation, or partial rotations.

I do away with a number of more, or less, rapidly vibrating joints, levers, arms, and the like, which cause an objectionable amount of noise and cause rapid wear of the working parts, as well as entailing the employment of a large amount of power in effecting the necessary frequent reversals of the directions of movement of relatively weighty parts, and I overcome the objection arising from the limited number of vibrations which can be imparted to the bags according to the old methods.

I will describe the invention with reference to the accompanying drawings, but I do not limit myself to the precise construction illustrated.

Figs. 37, 38 and 39 are respectively an elevation, plan and end view drawn to an enlarged scale of a device for facilitating the folding of the last side or flap of the bag. Figs. 40—41 and 42 show a modification (drawn to an enlarged scale) of a device which can be used for the purpose of the device shown in Figs. 37, 38 and 39. Figs. 43 to 47 illustrate the various folding operations performed on the bag. Figs. 48, 49 and 50 show respectively an elevation, plan and end view of a modification of the vibrating mechanism shown in Figs. 10 to 16 both inclusive. Fig. 51 shows a vibrating plate in its highest position. Figs. 52—53 and 54 show a modified form of the folding device illustrated in Figs. 37 to 39 both inclusive.

The bags or containers are fed to the apparatus of the present invention in any suitable manner, for instance either by hand, or by an apparatus such as described in the specification accompanying the application for Letters Patent Serial No. 744396 the said bags being delivered to a transfer device 1 (Figs. 1—2—3—6—7—8 and 9) integral with, or secured to, an arm 2 which is mounted on a shaft 3 having a segmental rack 4 at its opposite end. The transfer device is preferably formed as a box so as to inclose the bag on all sides, but open at each end, and the interior of the box is of a size to suit the bags which it is desired to fill. The segmental rack 4 is adapted to mesh with a similar rack 5 carried by an arm 6 loose on a pivot pin 7 carried by the framework 8 of the apparatus. The arm 6 is connected in any suitable manner to a rod 9 which is actuated from the auxiliary driving shaft 10 against the action of a spring 18 (see Fig. 4) by means of a cam 11 and bell crank lever 12 so that the transfer device 1 carrying a bag can be partially rotated through an angle of or about 90° so as to bring the transfer device carrying a bag from a horizontal position to a vertical position, in which position the bag is delivered into a box or receptacle 13 carried by the packet wheel. When the bag is in the vertical position, the aforesaid transfer device which incloses the bag on all sides acts as a guide which facilitates the proper delivery of the bag to the box or receptacle 13. The auxiliary driving shaft 10 is driven by gear wheels 22, 23 and 256 (see Fig. 5) from the main driving shaft sleeve 16.

On a horizontal plane underneath and in close proximity to the said guide, formed by the transfer device 1 is situated a wheel or disk 17 (Figs. 1—2—3—4—5 and Figs. 10–16 inclusive) hereinafter referred to as the packet wheel, which carries any suitable number of boxes or receptacles 13 (say for example twelve) and has intermittent movements of partial rotation imparted thereto.

When I use a bag-forming machine, in accordance with the bag-forming machine described in the application for Letters Patent Serial No. 744396 in combination with a packeting apparatus according to my present invention, I prefer that the intermittent partial rotations of the former wheel of the bag-forming machine and of the packet-wheel of the packeting apparatus take place alternately, that is to say, that a partial rotation of the former wheel shall not occur simultaneously with a partial rotation of the packet-wheel, as then the power required to perform the two partial rotations is more efficiently utilized. I do not however limit myself to this mode of operating as I may cause both wheels to move simultaneously if desired.

The aforesaid boxes, or receptacles, 13, which are carried by the packet-wheel 17, consist, in the case of rectangular bags, of four complete sides, but are open at their ends, the outer side however being preferably formed by a plate 19, (see Figs. 1—2 and 10–16) the other three sides being preferably formed in one piece or casting 20 secured to the packet-wheel 17. The construction of the aforesaid boxes, or receptacles, is such that when the plate 19 is secured to the casting 20, a complete openended box is formed. The boxes or receptacles carried by the packet wheel 17 are of a size and shape corresponding to that of the packets to be made, but the sides are shorter in length than the length of the bags, as shown in Figs. 6, 7, 8 and 9.

Figure 5:
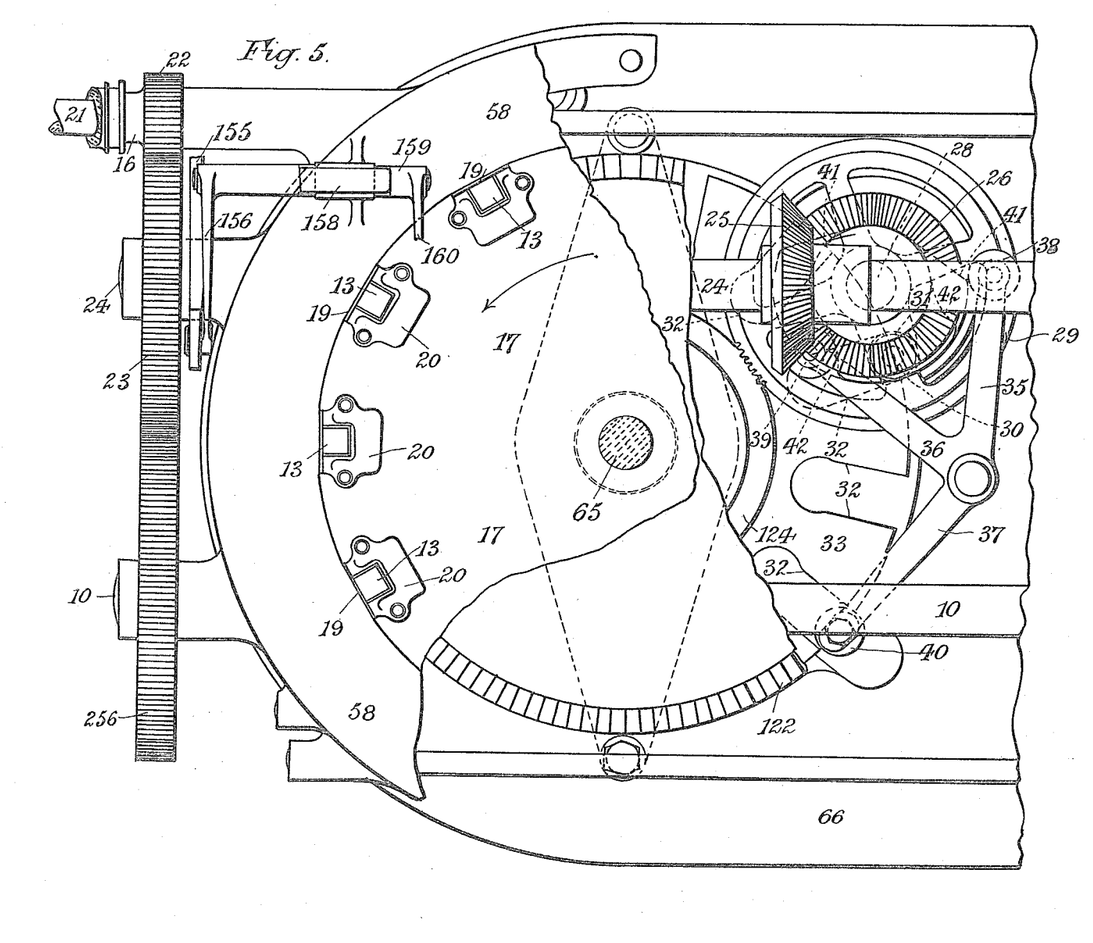
Fig. 5 is a plan showing the main driving gear and the packet wheel driving gear.
Figure 6:
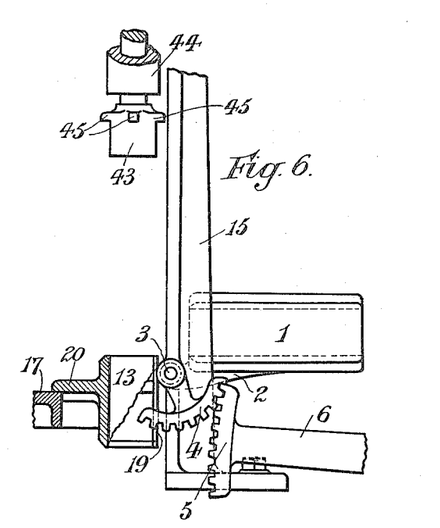
Figs. 6, 7, 8 and 9 are detail views drawn to an enlarged scale of the mechanism for feeding the bags to the packet wheel.
Figure 7:
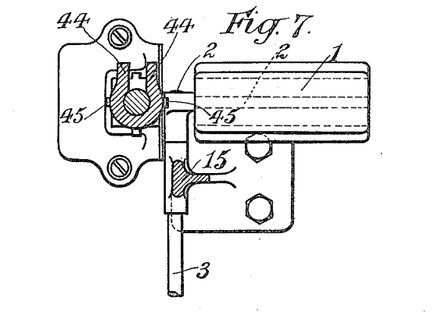
Figure 8:
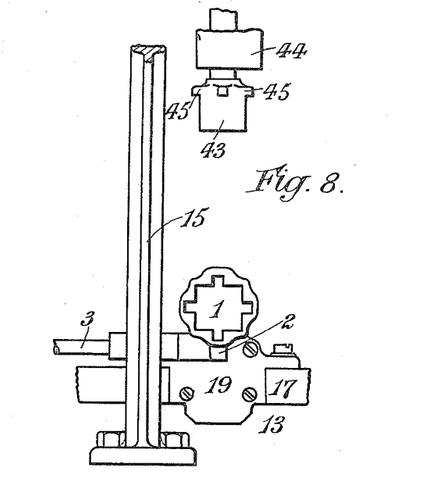
Figure 9:
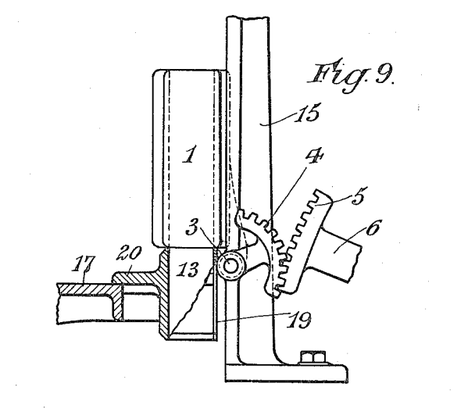

The packet-wheel 17 is rotated by any suitable means, such for example as shown in Fig. 5, in which 16 is the driving sleeve on the gudgeon 21, the said sleeve 16 having secured thereto a gear wheel 22. The packet-wheel 17 is intermittently rotated through the spur gearing 22, 23, auxiliary driving shaft 24 and bevel gear 25, 26. The bevel gear wheel 26 is mounted on a sleeve 27, (see Fig. 2) carried by the short shaft 28. Mounted on the lower end of the sleeve 27 is a spur wheel 29, or a disk, provided with a pivot pin 30 carrying a roller 31, which engages in succession with each of a series of slots 32 formed in the disk 33 mounted in the base-plate 66 and carried by a sleeve 34 (see Fig. 10) embracing a shaft 65, and to which sleeve is secured the packet-wheel 17. It is to be understood that the number of slots 32 in the aforesaid wheel or disk correspond to the number of boxes or receptacles 13 carried by the packet-wheel 17. In this arrangement it will be seen that the packet-wheel and the boxes or receptacles 13 are intermittently rotated so as to permit of the various operations on the bags of filling, vibrating, settling the material, compressing the said material, folding the open end of the bags, and subsequent ejection of the bag from the said box, or receptacle, 13.

Figure 2:
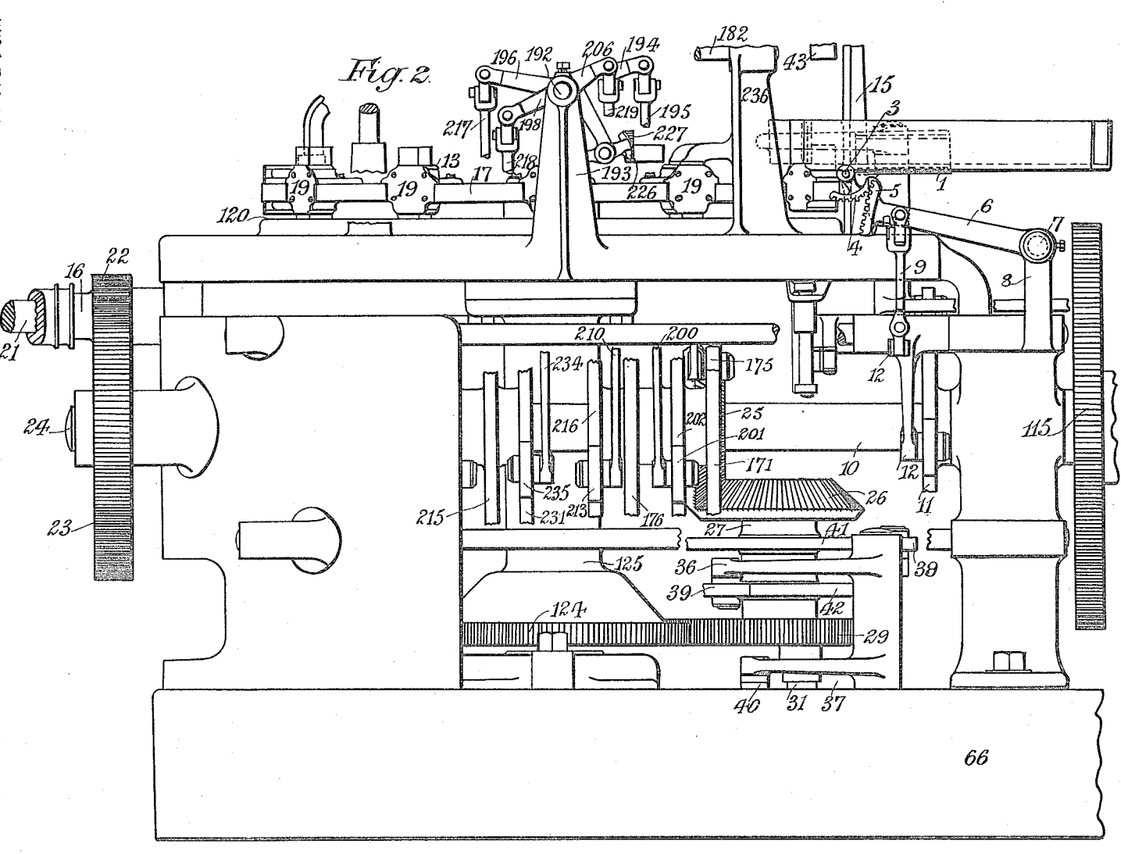
Figure 4:
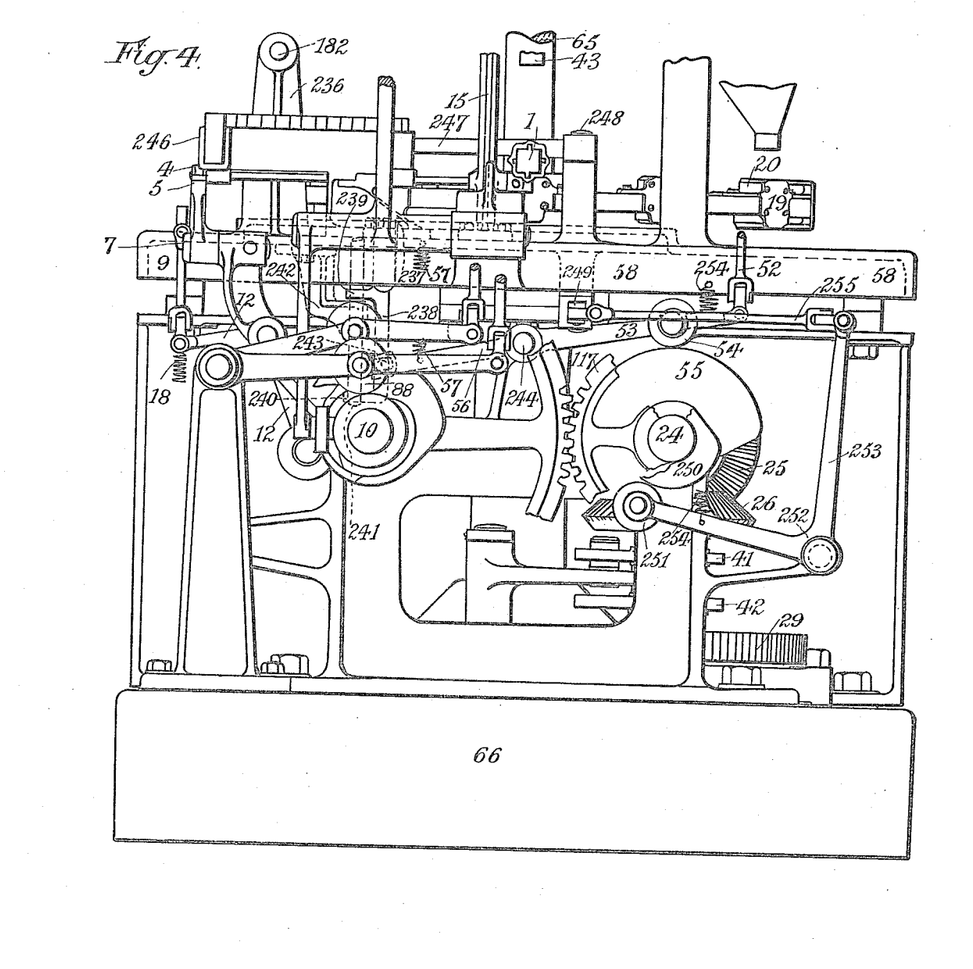
Fig. 4 is an end view looking in the direction of the arrow A Fig. 3.

The packet-wheel 17 is locked from rotation by means of a bell crank lever having three arms 35, 36 and 37 (see Fig. 5) carrying rollers 38, 39, 40, the roller 40 of which arm 37 is adapted to engage with one of the slots 32 when the roller 31 is clear of its respective slot. This arm 37 is positively operated in one direction to engage one of the slots 32 when it is necessary to lock the packet-wheel and when it is necessary to release the packet-wheel to permit of its being partially rotated, the arm 37 is positively operated in the other direction. The motion of the two arms 35, 36 is obtained from two peripheral cams 41, 42, as shown in Figs. 2, 4 and 5, which cams are so mounted on the sleeve 27 that the two arms are caused to mutually follow each other. That is to say, when the arm 36 is operated to release the roller 40 from the slot 32, the other arm 35 swings in the same direction as the arm 36, and when the arm 35 is operated to cause the roller 40 of the arm 37 to engage the slot 32, the arm 36 also swings in the same direction as the arm 35 under the action of its cam 42.

The packet-wheel is brought to rest at intervals due to the intermittent motion imparted to it and one of these positions of rest is such that the box or receptacle 13 is immediately underneath, and in close proximity to, the lower end of the aforesaid guide, formed by the transfer device 1 so that a box or receptacle 13 forms a continuation of the said guide. Above the said guide is a plunger 43 (see Figs. 1—6—8) having projections 45, which plunger is supported and guided in a boss 44 forming part of a bracket 15. This plunger 43 is capable of vertical movement so that at the proper time the plunger will enter the bag to such an extent as to permit the projections 45 coming into contact with the bag and so force it out of the guide into the box or receptacle 13. Motion is transmitted to the plunger 43 from the auxiliary driving shaft 24, Figs. 3 and 4, by the following means. Secured to the plunger 43 at any suitable point of its length is a pivot pin 46 (Fig. 1) which is connected to an oscillating arm 47 loosely mounted on a stationary shaft 48. The arm 47 is connected by a bridge piece 49 (Fig. 3) to a boss 50 also loose on the shaft 48 and formed on this boss is an arm 51 which, when operated, transmits its motion to the oscillating arm 47. The arm 51 is connected by a rod 52 to an oscillating lever having two arms 53, 56, see Figs. 1—3—4 and to the arm 53 is secured a roller 54 actuated by a cam 55 mounted on the shaft 24. The roller 54 is maintained in contact with the cam 55 by a spring 57, one end of which is secured to the arm 56 of the oscillating lever, the other end being secured to any suitable part of the circular guard 58, or to the framework.

If desired the transfer device 1 can be provided with stops or grippers to hold the bag in position and the said stops or grippers can be operated by mechanism to cause them to open so as to allow the bag to be ejected from the guide formed by the transfer device 1.

As soon as the aforesaid plunger 43 has been withdrawn out of the way of the bag which has been forced into the box or receptacle 13, a partial rotation is imparted to the packet-wheel 17 by the mechanism hereinbefore described and the next succeeding box or receptacle is brought into position immediately under the aforesaid guide so as to receive a bag.

The circular guard 58 consists of a suitably shaped plate or support arranged underneath the boxes or receptacles 13 so as to support the said bags and the said guard is arranged to cover the requisite distance along the circular path over which the aforesaid boxes or receptacles are caused to move by the intermittent movement of the packet-wheel.

The mechanism for vibrating or shaking the bags according to my invention is simple and efficient and free from objectionable noise and excessive wear on the moving parts.

Figure 13:
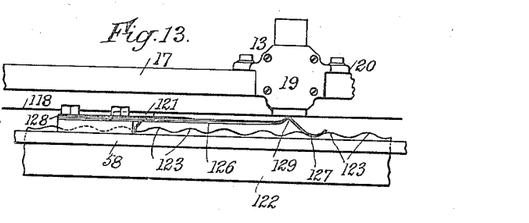
Figure 14:
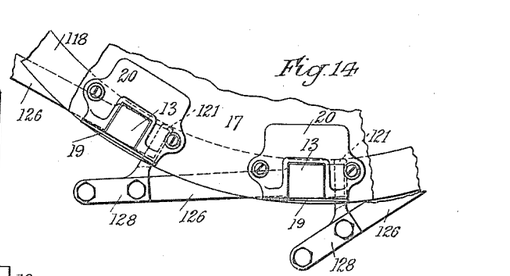
Figure 15:
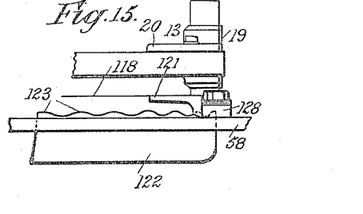
Figure 16:
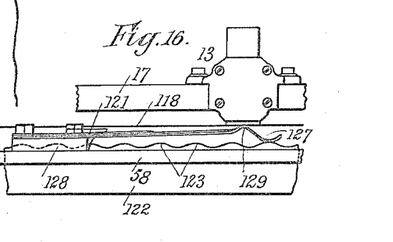

The means I employ for this purpose can be arranged as follows: A flexible plate 118 (Figs. 10 to 16 both inclusive) of suitable shape and dimensions is supported near to and underneath the horizontal plane along which the boxes, or receptacles, 13 move during the intermittent partial rotatory movements of the packet-wheel 17. The said plate 118 forms a support for the bags when they are brought to their stationary position and also when they are traveling along a portion of their path. I prefer that from the point at which the bags commence to travel over the said plate to the point at which the bags complete their travel over the said plate, the said plate shall form a continuous path underneath the bags, so that when vibrating motion is imparted to the said plate 118 it is directly communicated to the bags and their contents. The said plate 118 is formed of a strip of flexible material of suitable width and preferably of steel and is secured at the points 119 (see Fig. 3) to the circular guard 58 and is supported when in its lowest position by the projecting arms 121 Figs. 13, 14, 15, 16, which form stops and are secured to the circular guard 58. These stops limit the vertical downward movement of the flexible plate 118. The said guard is formed with a raised part 120 Figs. 10, 11 which extends approximately half around the packet wheel as shown in dotted lines in Fig. 3. This raised part forms a support for the bags after compression of the material therein and until the period of filling begins. The ends of the raised part 120 are recessed to receive the flexible plate 118 which is so secured as to form a flush surface all around. The position of the flexible plate 118 on the apparatus is such as to present a surface which can be caused to vibrate during the period between filling the bags and compressing the material in the said bags. Vibrating motion is imparted to the said flexible plate 118 by a cam wheel 122, or disk, having raised surfaces, or projections, 123 (Figs. 5, 11, 13, 15 and 16) around its periphery, which cam wheel 122 is caused to rotate continuously (although the rotation can if desired be intermittent) by the gear wheel 29 Figs. 4 and 5 which engages the gear wheel 124 secured to a sleeve 125 (Fig. 10) rotating on the sleeve 34 which is mounted on the stationary shaft 65, the said sleeve 125 having the cam wheel 122 Figs. 10 and 11 secured to its upper end as shown. The continuous or intermittent motion of the cam wheel 122 is converted into a vibratory motion which is transmitted to the flexible plate 118 by a number of flexible arms 126, Figs. 13—14—15 the free ends 127 of which are bent somewhat in the manner shown in Figs. 13 to 16 so that the said ends rest on and are caused to rapidly vibrate by the action of the raised surfaces 123 or projections on the face of the cam wheel 122. The other ends of the flexible arms 126 are secured to the circular guard 58 at the points 128. If desired a kink such as shown at 129 in Figs. 13, 15, 16 is preferably formed at the end of the arm 126 so as to allow of the vibration of the flexible plate 118.

There may be any desired number of raised or cam surfaces 123 on the aforesaid cam wheel 122 and they may be disposed at equal distances from each other, or there may be any desired variation in the distances between them. I prefer however that the distances shall be such that only one of the aforesaid projections 127 on the aforesaid arms 126 shall be in contact with the highest point of any of the aforesaid raised or cam surfaces on the cam wheel at one time. In this manner I further reduce the noise produced by the apparatus, as practically the only noise produced by the vibrating mechanism is due to a number of relatively small taps, or concussions, instead of being due to a number of taps, or blows, several of which may occur at the same moment.

Figure 10:
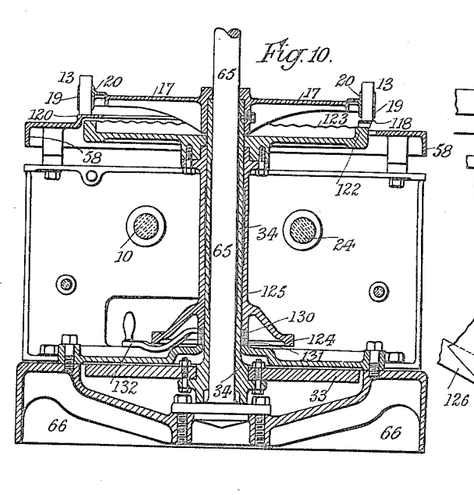
Figs. 10 to 16 both inclusive illustrate details of the vibrating mechanism, Figs. 13–16 inclusive being drawn to an enlarged scale.
Figure 11:
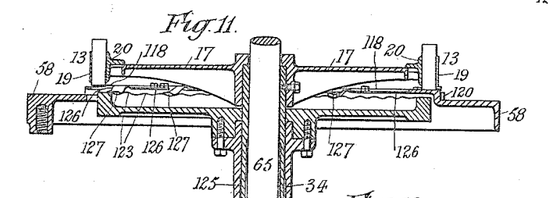
Figure 12:
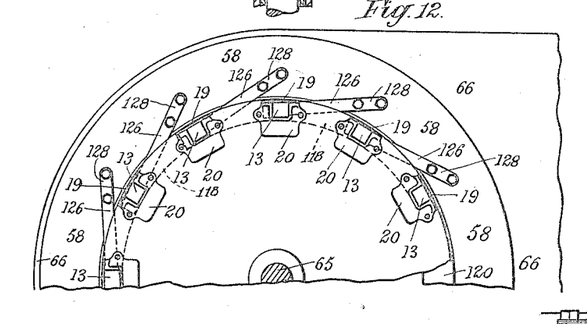

The aforesaid cam wheel sleeve 125 is supported, at its lower end, on a cam ring, or bearing, 130, Fig. 10 which is caused to move within certain limits in a vertical direction and which has on its underside a number of inclined surfaces, or cam-like teeth, (somewhat like a claw-clutch,) which rest upon corresponding cam-like, or inclined, surfaces on the upper face of a fixed collar, 131, (Fig. 10), or support. An arm 132 (carrying, if desired, a pointer) is attached to the said ring, or bearing 131, and is capable of being moved through a graduated circular arc by hand. In this manner the inclined surfaces of the ring, or bearing, 130, are caused to slide on the corresponding inclined surfaces on the aforesaid fixed collar 131, or support, thereby varying the vertical height of the said ring, or bearing 130. The cam wheel 122, is by this means made to occupy a position in a horizontal plane nearer to, or farther from the aforesaid flexible plate 118, and also the underside of the packet-wheel 17. The vibrations imparted to the aforesaid flexible plate 118, can thus be varied from a maximum to a minimum, whether the packet-wheel be moving or at rest.

If desired the aforesaid vibratory motion may be modified as follows:—A suitable number of vibratory devices can be employed, see Figs. 48, 49, 50, 51, of a length equal, or approximately equal, to the distance covered by any two adjacent bags, or containers, and the space between them, and arranged in such a manner that they constitute a continuous support for the said bags, or containers, along a portion of the path which the said bags, or containers, travel as they are carried intermittently around by the packet-wheel. Each of the vibratory devices consists of a suitable number of flexible plates 118 one above another which, previously to being secured together, were of arch form longitudinally. Assuming, for example, that in each vibratory device three flexible plates are employed, two of these plates, with their arched surfaces in contact, are placed, with their convex surfaces upward, above the third, or lowermost, plate which has its convex surface downward. The said plates are then secured together, midway, or approximately midway, of their length, (for example by screws, rivets, or the like) whereby the upward surface of the lowermost plate and the downward surface of the plate immediately above it are brought into contact so that the combined plates are then flat, or of approximately a flat shape. By this arrangement the extreme ends of the plates are caused to exert a slight yielding pressure on each other whereby a damping effect is obtained which materially reduces the noise which would be caused by the rapid vibrations imparted to a single plate. The lowermost plate of each of the said vibratory devices is secured to blocks 130

260, 261 one of which is pivoted, or hinged, to a gudgeon or pin 262 and the other is pivoted, or hinged, at 263 to an arm, or rocker 264, and is caused to vibrate by means of a roller, 265 or projection, suitably secured to the underside of the lowermost plate, and acted upon by the projections on the rotating cam wheel, 122 or disk. The pin 262 is carried by a bracket 266 which is secured to the circular guard 58. This bracket 266 is provided with two projecting arms 267—268 which support the flexible plate or plates 118, and which also limit its downward movement. The arm or rocker 264 carrying the pin 263 is mounted on a pin 269 carried by a boss 270 on the bracket 266. This construction allows of the contraction of the distance between the centers due to the bending of the plates when being vibrated.

By the arrangement described the vertical vibratory motion which is imparted to the flexible plates by the cam wheel, or disk, is greatest at that part where the roller, or projection, is secured and least at the opposite end of the said flexible plates, and these plates are so situated in the apparatus that the roller or projection, is immediately beneath the bag, or container, when the packet-wheel is at rest. It will thus be seen that the maximum amount of vibration is imparted to the bags, or containers, while they are at rest, as far as traverse by the packet-wheel is concerned, and it is only when the bag, or container, is being intermittently moved by the packet-wheel, that the said bag, or container, passes over the ends of the said flexible plates which are capable of imparting the minimum amount of vibration. In this manner the greatest possible efficiency of the vibratory motion is secured as the movement of the bags, or containers, over the ends of the said flexible plates is so relatively rapid that the practical absence of vibration at that time is of small importance.

Although I have instanced the use of three flexible plates, any other number may be used and any number of vibrating devices may be employed suitable for the particular material to be packed, as it will be evident that different materials require more, or less, vibratory motion imparted to the bags, or containers, in order to settle the material to the requisite extent in the bags, or containers. If desired, any suitable arrangement of stops may be employed to limit the downward movement of the flexible plates.

Figure 19:
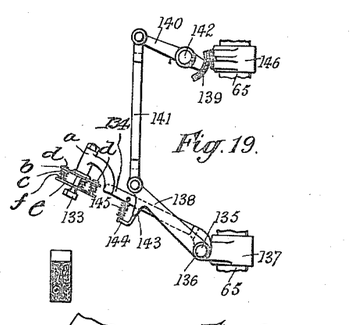
Figure 20:
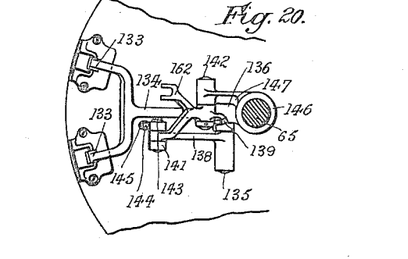
Figures 21, 23:
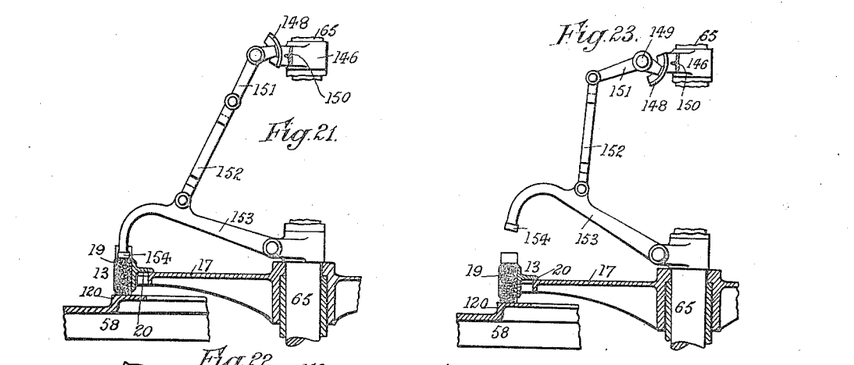
Figs. 21–24 both inclusive illustrate the compressing mechanism in two different positions.
Figure 22:
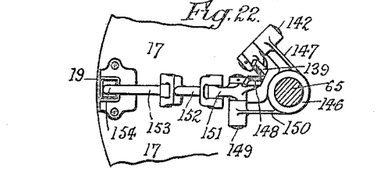
Figure 24:
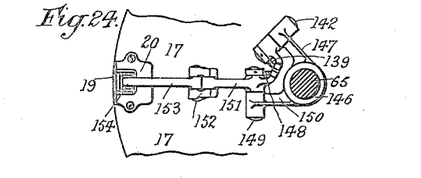

In order to assist the effect of either of the aforesaid vibrating motions, in settling the contents of the bags, a number of plungers are provided which are operated in such manner as to enter into the open ends of a corresponding number of bags and exert a yielding pressure on the contents thereof. These plungers are marked 133, see Figs. 17, 18, 19, 20, Figs. 17 and 18 being respectively an elevation and plan of the said plungers in their lowest position and Figs. 19 and 20 showing the said plungers in their raised position.

The plungers 133—133, which I will refer to as the settling plungers, are carried on the forked ends of a Y shaped lever 134, which is pivoted at 135 to a projection 136 on a sleeve 137, mounted on the shaft 65. Loose on the pivot pin 135 is an arm 138 which is coupled to a beveled segmental rack 139, carried by a lever 140, which is pivotally connected at its end to a rod 141, the lower end of which is pivoted to the lever 138. The beveled segmental rack is loosely mounted on a pivot pin 142, and the plungers and Y shaped lever are prevented from moving downward below a predetermined position by a stop 143 on the lower side of the arm 138. This stop is provided with a projection 144 to which is attached one end of a spring 145 the other end of the said spring being connected to the arm 134, as in Figs. 17, 18, 19, 20.

Figure 17:
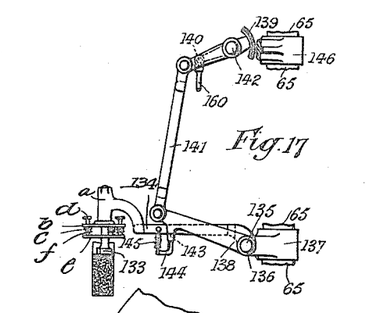
Figs. 17 to 20 show the plungers and associated parts which operate to assist the material in settling down.
Figure 18:
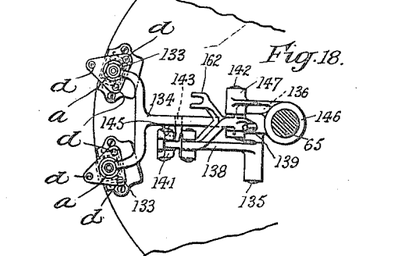

The settling plunger 133 is mounted in a boss $a$ provided with a plate $b$ supporting hollow projecting pieces $c$ within which slide the headed pins $d$. These pins $d$ carry a plate $e$ which, as shown in Fig. 17, is adapted to rest on the top of a bag when in the lower position, there being provided resilient means such as springs $f$ which are interposed between the two plates $b$ and $e$ so as to permit of relative movement of the bag and its contents.

A sleeve 146 (at some distance above the sleeve 137) is provided on the stationary shaft 65 and on this sleeve is an arm 147 which supports the pivot 142 and the segmental rack 139 and its lever 140. This rack 139 see Figs. 21 to 24 gears with a similar rack 148 which is supported on a pivot pin 149 carried by a projecting arm 150 from the sleeve 146. Formed in one with the lever of the rack 148 is an arm 151 which is pivotally connected to a coupling rod 152 connected at its lower end to the lever 153, which lever carries the compressing plunger 154. It will be seen on referring to Figs. 21 to 24 inclusive, that the centers of the pivot pins carrying the link 152, levers 151 and 153, are in alinement so that the plunger 154 when its lowest position is locked against upward movement until the segmental rack 148 is positively operated to raise the aforesaid plunger 154 on the lever 153.

Figure 25:
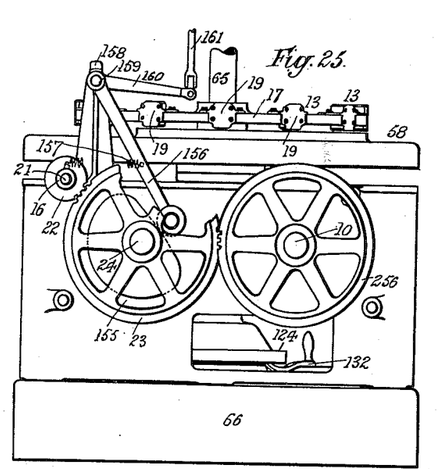
Fig. 25 shows the mechanism by which the compressing plungers are operated.

The motion of the settling and compression plungers 133, 133, and 154, respectively, is derived from the shaft 24 see Fig. 25. On this shaft is a cam 155 which operates a roller-arm 156 against the action of a spring 157 secured respectively to the arm 156 and any suitable part of the frame. The motion of the arm 156, which is connected by a bridge piece 158 see Figs. 3 and 25 to a boss 159 carried by a lever 160, is transmitted to a rod 161 through the aforesaid connections. Pivoted to the upper end of the rod 161 is a short forked lever 162 Figs. 3–18 and 20 which is formed on the boss carrying the segmental rack 139, which rack gears with the rack 148 and thus operates the compression plunger 154.

If desired the settling plungers 133, 133 can be provided at any suitable point with shields which are preferably loose on the said plungers, the said shields being adapted to bear on the upper ends of the bags in such manner as to keep the bag in constant contact with the flexible plate 118 during vibration of the said plate. Springs can be provided which can be connected at one end to the aforesaid shields and at the other end to the plungers so as to form a resistance sufficient to keep the shields when in use constantly bearing against the top of the bags.

Figure 3:
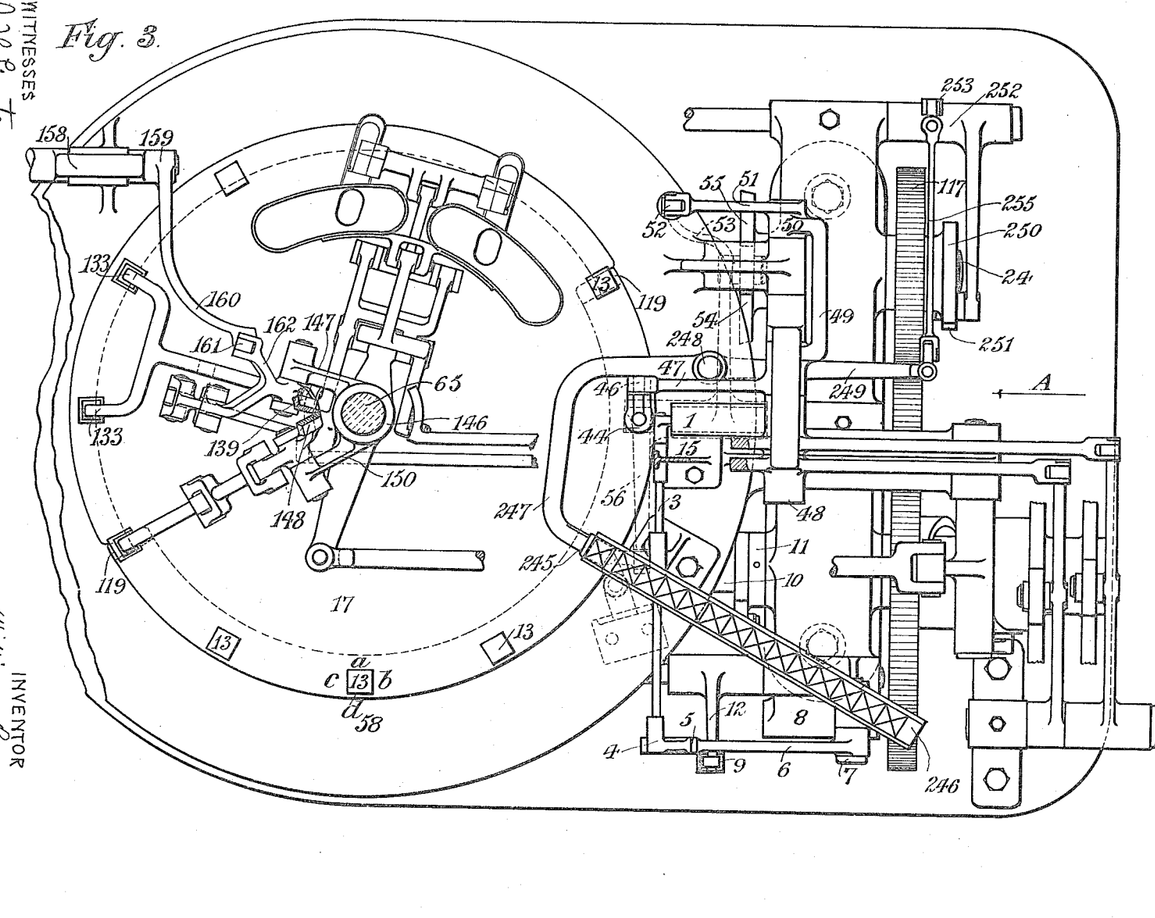
Fig. 3 is a plan of Fig. 1.

The folding mechanism shown in Figs. 26 to 36 comprises a number of blades or fingers hereinafter referred to as blades, unless the contrary is stated. These blades perform five distinct operations on the top of the bag in folding the sides thereof, as shown in Figs. 3 and 43 to 48; I will for convenience refer to the sides of the bag as $a$, $b$, $c$, $d$, (the side $a$ being the inner side facing the shaft 65) as shown in Fig. 3 and the said sides being preferably folded in the order indicated, but I do not limit myself to this order of folding down the sides of the bag, as they may be folded down on top of the contents of the bag in any suitable order.

The first side $a$ (Fig. 3) of the bag is folded on top thereof by a blade 163 (see Figs. 30 to 33 inclusive) mounted on a pin 164 upon which it is capable of turning and on this pin is secured an oscillating arm 165 so that the blade has two independent motions, one a swinging motion due to the oscillating arm 165 and a motion of the rotation on the pin 164. The arm 165 receives its motion from the cam 176 see Figs. 26 and 29 which operates the roller 177 against the action of a spring. The roller 177 is carried by a lever 178 (Fig. 27) on the shaft 173, the said lever having a short arm 179 formed in one with it, which short arm is connected to an extension 180 of the arm 165 by a rod 181. 182 is a pivot pin carried in a bracket 236 and upon which pin the levers 165, 168, 183 are loosely mounted. Under the swinging motion the blade 163 is brought toward the side $a$ of the bag and on account of the action of the link 166 Figs. 30 and 32 which is pivotally connected to the boss 167 carrying the blade 163, the said blade is caused to come into a vertical position against the side $a$ of the bag. In this position of the blade 163 the axis of the pin 164 is in alinement with the folding edge of the side $a$ of the packet. The other end of the link 166 is connected to one arm 168 of a bell-crank lever having its other arm 169 jointed to a coupling rod 170 which is operated by the cam 171 mounted on the shaft 10. The lower end of the coupling rod 170 is connected to a short lever arm 172 pivotally carried on a stationary shaft 173 which extends between, and is supported by, the side cheeks of the apparatus. This lever 172 has another arm 174 carrying a roller 175 Fig. 27 which bears on the cam 171 against the action of a spring (not shown). When the blade 163 assumes the vertical position against the side $a$ of the bag, the boss 167 carrying the blade 163 is rotated so that the side $a$ of the bag is caused to be folded down on top thereof. This blade 163 remains in this position until the remaining sides of the bag are folded over and the blade is locked against upward motion because the centers of the link 166, arm 168 and the link connection 167 to the blade 163 are in alinement.

After the side $a$ Figs. 43 to 47 of the bag has been folded the blade 184, (see more particularly Figs. 37, 38) which is carried on the end of a spindle 185 supported in a sleeve 186 which forms the boss of a lever 187 now acts on the side $b$ of the bag. A spindle 188 is formed on the lever 187, which spindle is supported by a sleeve 189 having a boss 190 extended to form a lever 191, see Figs. 34 to 39. On the gudgeon 192 carried by a bracket 193 secured to the circular guard 58 are supported a number of bell crank levers each having a pair of arms. These bell cranks are arranged in pairs, the two arms of each pair being numbered respectively 191—194, 196—197, 198—199, 206—207. The arm 191 carries the blade 184 into position to fold the side $b$ of the bag, while the arm 194 is connected by a connecting rod 195 to a bell crank 200 see Fig. 26 on the shaft 173, which bell crank has a roller 201 operated by cam 202 against the action of a spring. The arms 191 and 194 are connected by a bridge piece 203, Fig. 28 likewise the arms 196—197 by a bridge piece 204 and 198—199 by a bridge piece 205, and 206—207 by a bridge piece 208. Each of the arms 196, 198 and 206 is connected respectively to a bell crank lever 208ª, a pivoted lever 209 and a bell crank 210. The bell crank lever 208ª pivoted lever 209 and bell crank 210 mounted on the shaft 173 are each provided with a roller 211, 212, 213 respectively, which are operated against the action of springs by the cams 214, 215 and 216, and the said levers 208a, 209, 210 are connected by rods 217, 218, 219 and these are connected to their respective oscillating arms 196, 198, 206. On the lever 187 Figs. 37–39 is a forked projection 220 which is coupled up to the arm of a bell crank Fig. 34 by a link 221 the other end 198 of the bell crank being operated by the rod 218.

Figure 26:
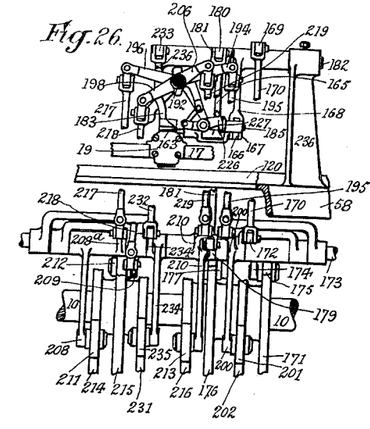
Figs. 26 to 36 both inclusive illustrate the folding mechanism, Fig. 30 to 36 being drawn to an enlarged scale.
Figure 36:
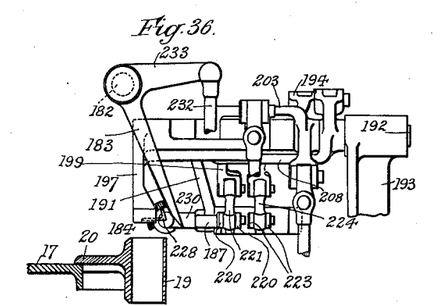

On the sleeve 189 Fig. 37 is supported a long boss 222 having a forked projection 223 which is connected by a link 224 Fig. 36 to a bell crank 207, the other end 206 of the bell crank being connected to the rod 219 which is operated from the cam 216 Fig. 26. This boss 222 carries a projecting arm 225 having a segmental rack 226 which gears with a beveled segmental gear 227 secured on the pin 185.

Figure 27:
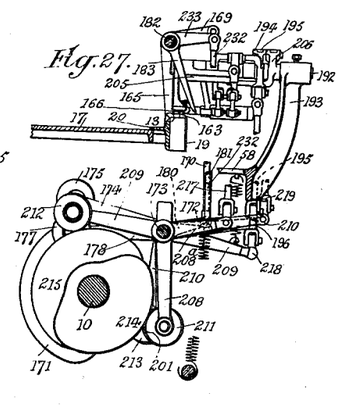
Figure 28:
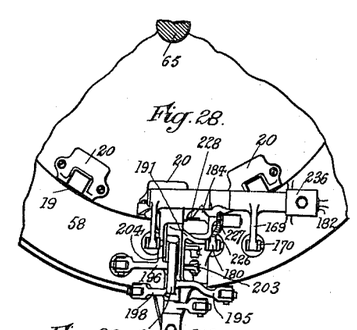
Figure 29:
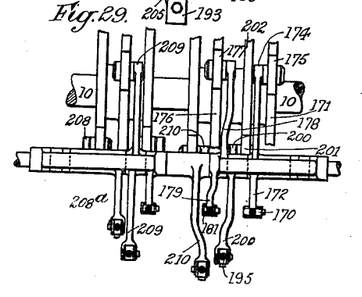
Figure 30:
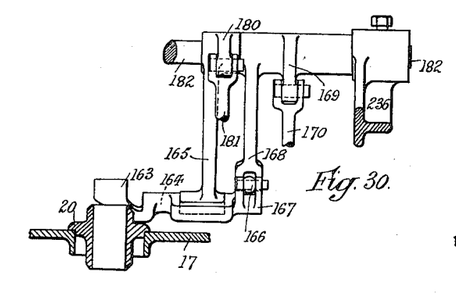
Figure 31:
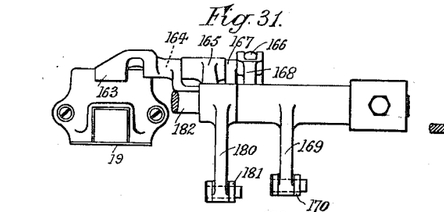
Figure 32:
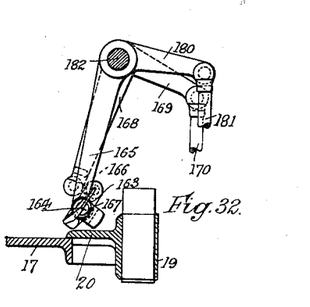
Figure 33:
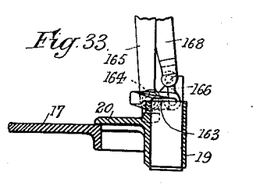
Figure 34:
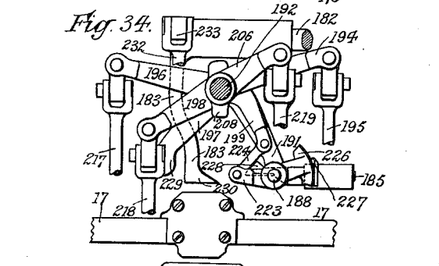
Figure 35:
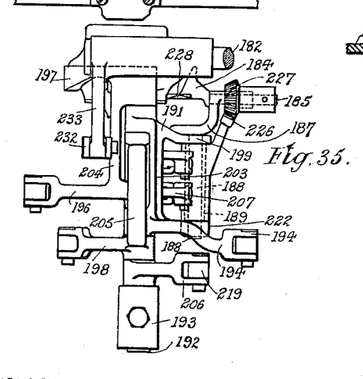
Figures 40, 41, 42, 43, 44, 45, 46, 47, 48, 49, 50, 51, 54:
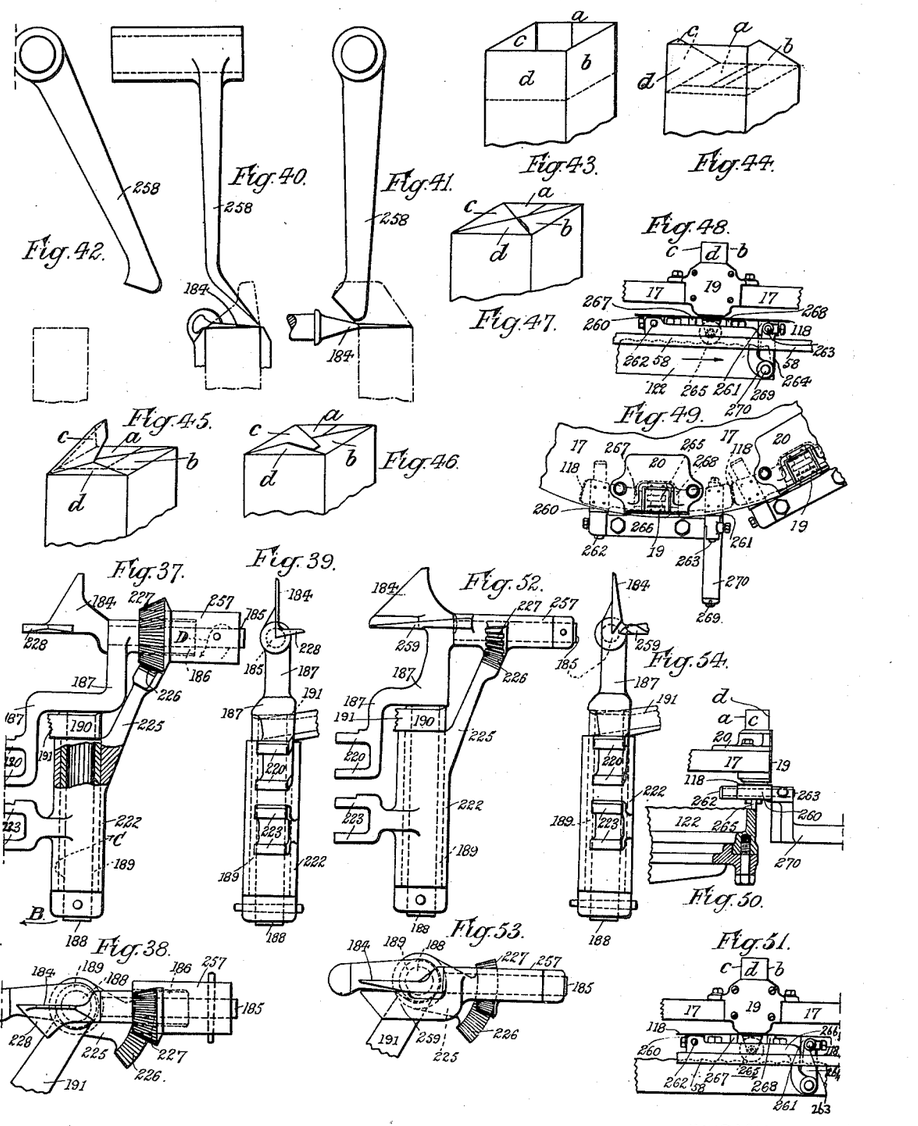

When the side $a$ of the bag has been folded, the blade 184 is first swung inward by the lever 191, as shown by the arrow B, (see Fig. 37) so as to bring the axis of the pin 188 into alinement with the foldable edge of the side $b$ of the bag. While the blade 184 and the pin 188 are being swung as a whole in the direction of the arrow B, the lever 187 carrying the blade 184 is rotated by the link 221 on the pivot pin 188 (in the direction of the arrow C Fig. 37) so that the operative face of the blade is brought into a vertical position. The pin 188, see Figs. 37, 38, 39, is then rotated on its axis in the reverse direction which causes the blade 184 to assume a horizontal position and as the face of the said blade 184 is against the side $b$ of the bag, the said side is consequently folded down onto the blade 163 which is holding down the side $a$ of the bag. As the pin 185 is now rotated on its axis (in the direction of the arrow D Fig. 37) due to the combined action of the link 224 and the racks 226, 227, the part 228 of the blade 184 forces the side $d$ of the bag outward into an inclined position as shown in Fig. 45. This causes the sides $c$ and $d$ to be broken along predetermined lines so that the final folding is completed along these lines and bundling of the last fold of the side $d$ is avoided. After the side $b$ is folded and while the side $d$ is in the outwardly inclined position, a round nosed projection 229 on the arm 197 acts on the side $c$ of the bag owing to the action of the cam 214 and the connections 211, 208 and rod 217 which acts on the arm 196 and causes it to swing on the stationary shaft 192 so that the side $c$ of the bag is thus folded on top of the side $b$. Immediately the round nosed projection 229 comes in contact with the fold $c$ the blade 184 is withdrawn so as to permit of the projection 229 folding down the side $c$. While the round nosed projection 229 Fig. 34 is holding the side $c$ of the bag down, the wiper arm 183 having a beveled end 230 is rotated on its pivot 182 by the action of the cam 231. Figs. 26, 27, 36, on the rod 232 which is connected to an extension 233 of the arm 183. Interposed between the rod 232 and cam 231 is a bell crank 234 having one end connected to the rod 232 and the other end to an arm pivoted at 173 and carrying a roller 235, which roller is held on the cam by a suitable spring (not shown). If desired a cam shaped projection can be secured to the circular guard 58, or any other suitable part of the apparatus, in order to complete the folding down of the side $d$ of the bag and retain it in this position until just before the packet is ejected from the box or receptacle 13.

The part 228 on the blade 184 can, if desired, be formed in one piece 259 with the boss 257 free on the spindle 185 which boss carries the rack 227 as shown in Figs. (52–54) inclusive. The motion of the parts in this case is the same, but the blade 184 remains stationary while the aforesaid part 259 rotates with the boss 257 and rack 227.

Figure 1:
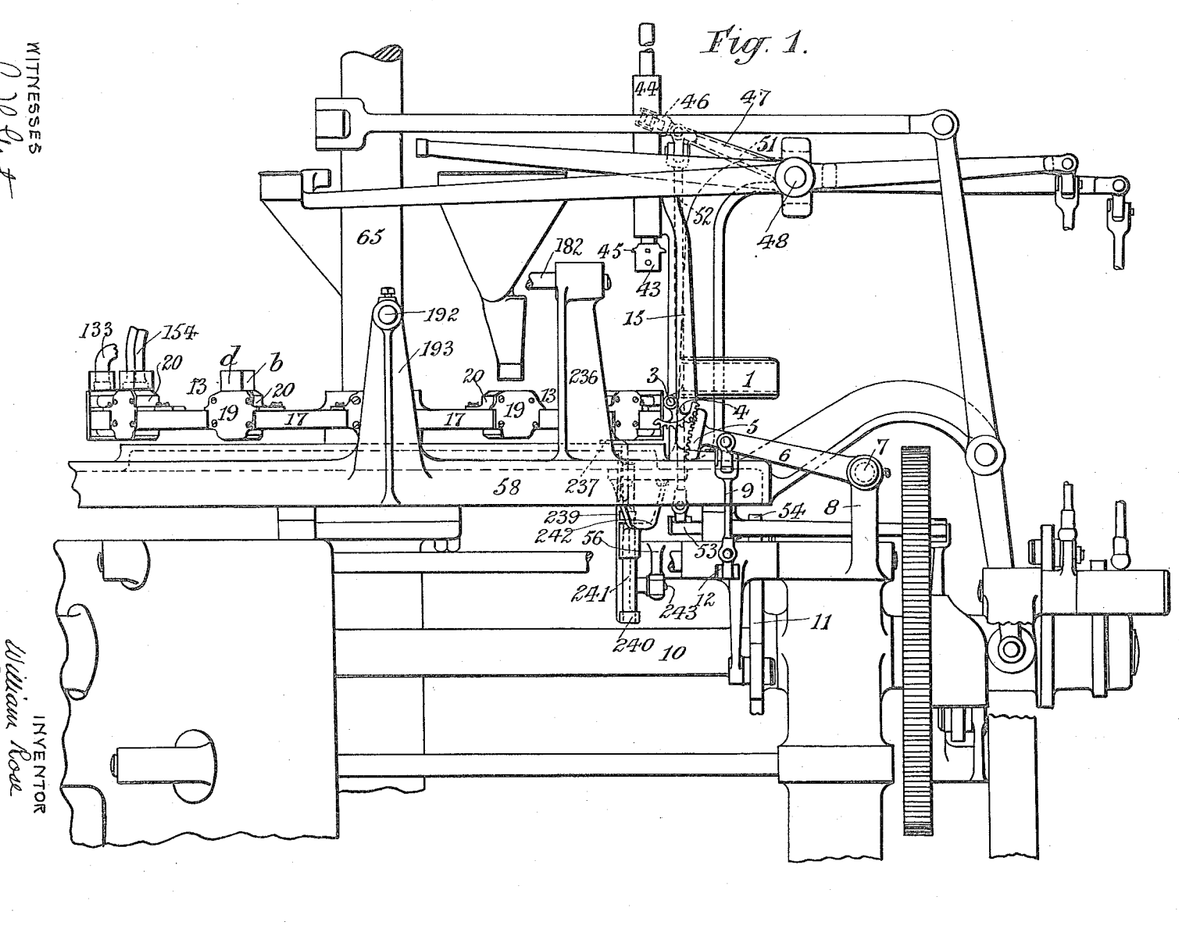
Figures 1 and 2 are side elevations of an apparatus constructed in accordance with my invention.

Referring to the device for ejecting the filled packets from the boxes or receptacles 13, which device is shown in Figs. 1, 3 and 4, this device consists of a plunger 237 which is carried by a sliding bracket 238 having bosses 239, 240, mounted so as to be capable of sliding on a stationary spindle 241. This spindle 241 is carried by a bracket 242 supported from the underside of the circular guard 58. The aforesaid sliding bracket 238 carries a pivot pin 243 which engages the forked end of the lever 56 see also Fig. 4 forming an extension of the lever 53. These two lever arms 53, 56 are formed in one piece and are pivoted at 244 and the arm 53 is operated as hereinbefore described. This ejecting plunger pushes the packet out of the box 13 into such position, clear of the boxes underneath the said packet, and retains it there, so as to permit of another plunger 245 acting on the packet to push it into the delivery trough 246. The plunger 245 is carried by an arm 247 pivoted to the circular guard 58 at 248. The arm 249 is formed as an extension of the arm 247 and is operated by a cam 250 on the shaft 25 against the action of a spring 254, which cam acts on a roller 251 on a boss 252 having another arm 253 which is coupled up by the rod 255 to the arm 249. The aforesaid connections operate the plunger to eject the packet from the plunger 237 into the trough 246.

Instead of the method of folding the last side $d$ outward by the device shown in Figs. 37, 38, 39, I may use the wiper arm 258 shown in Figs. 40, 41, 42. This wiper arm 258 may be used instead of the part 228 and be operated in any convenient manner independently of the blade 184.

What I claim is:—

1. A packeting apparatus having an intermittently rotating body, resilient means adapted to simultaneously support a plurality of bags mounted in said intermittently rotating body, and means horizontally arranged and adapted to operate said resilient bag-supporting means so as to simultaneously vibrate a plurality of bags.

2. A packeting apparatus having an intermittently rotating body, resilient means adapted to simultaneously support a plurality of bags arranged in said intermittently rotating body, rotatable means to vibrate the bag supports and interposed transmission means between said supports and rotary vibrating means.

3. A packeting apparatus having an intermittently rotating body, resilient bag-supporting means disposed in proximity to the intermittently rotating body, rotatable means beneath said resilient bag-supporting means, and resilient means actuated by said rotatable means and adapted to transmit vibratory motion to said resilient bag-supporting means.

4. A packeting apparatus having an intermittently rotating body, resilient means arranged under said body to support bags projecting therethrough, a rotatable cam-wheel under said resilient bag-supporting means, stationary plates having a fixed end and a free end operatively interposed between the rotatable cam-wheel and the bag-supporting means to vibrate the latter on the rotation of the cam-wheel.

5. A packeting apparatus having an intermittently rotating body, receptacles therein, bag-supporting means comprising a flexible plate at some distance from the lower ends of said receptacles, a stationary support for the flexible plate adapted to maintain the said plate out of contact at all times with the lower ends of the aforesaid receptacles.

6. A packeting apparatus having an intermittently rotating body, receptacles in said body adapted to carry bags, resilient means adapted to support a plurality of bags, a rotatable cam-wheel concentrically arranged relatively to the intermittently rotating body and means actuated by said rotatable cam-wheel to vibrate the resilient bag-supporting means.

7. A packeting apparatus having an intermittently rotating body, means thereon to carry bags, resilient bag-supporting means forming a path over which the bags pass, stationary means to vibrate the same, and a rotatable cam-wheel adapted to operate on said vibrating means not only when the bag is halted but also when moving with the intermittently rotating body.

8. In an apparatus for the purpose described a vibratory support and a ring or bearing arranged to move in a vertical direction and having on its underside a number of inclined surfaces which rest upon corresponding surfaces on the face of a fixed collar or support and means for moving the ring relatively to the collar so as to alter the extent of the vibrations of the said vibrating support.

9. In an apparatus for the purpose described, a flexible plate, or plates, forming a path over which the bags pass, a cam or cam wheel having raised surfaces or projections, flexible arms bearing on the said raised surfaces or projections and interposed between the said flexible plate, or plates, and the raised surfaces on the operative face of the cam wheel and means for rotating the said cam wheel so as to actuate the flexible arms and so cause the flexible plate to vibrate.

10. In an apparatus for the purpose described, a cam wheel having raised surfaces or projections on its operative face, and a plurality of vibratory arms bearing on the cam, the said raised surfaces or projections on the cam being so shaped and pitched that only one of the arms is in contact with the highest point of any of said raised surfaces or projections on the cam wheel at one time.

11. In an apparatus for the purpose described an intermittently rotating body adapted to carry a number of bags, resilient bag-supporting means, a plurality of oscillating plungers adapted to simultaneously enter a corresponding number of bags, means for operating the said plungers and resilient means connecting said plungers and the operating means therefor.

12. In an apparatus for the purpose described, an intermittently rotating body having means to carry bags, resilient bag-supporting means, a plurality of plungers adapted to enter a corresponding number of bags, means for operating said plungers, resilient means connecting said plungers and the operating means therefor, and means for positively limiting the downward movement of said plungers.

13. In an apparatus for the purpose described, the combination with the settling plungers of means carried by the said plungers, the said means being adapted to rest on the top of the bag so as to permit of relative movement between the bag and its contents.

14. In an apparatus for the purpose described, an intermittently rotated bag carrier, a series of settling plungers adapted to enter the bags when said carrier is halted, means for constantly vibrating the bags while halted and while traveling between halts, and means for stopping the vibratory motion after the last plunger of the series has ceased to act.

15. A packeting apparatus having an intermittently rotating body, receptacles therein for the reception of bags, resilient bag-supporting means, means for vibrating the bags, and co-acting folding blades one of which acts to fold the first side of the bag, and means for maintaining the first side folding blade in its operative position during the folding of the remaining sides of the bag.

16. A packeting apparatus having an intermittently rotating body, receptacles therein for the reception of bags, resilient bag-supporting means, means for vibrating the bags, means for folding the upper end of a bag, the said means being so arranged that the folding operations are effected by partial rotary motions of the folding means around axes which are coincident with that edge of the packet-top on which the paper is to be creased or folded.

17. A packeting apparatus having an intermittently rotating body, receptacles therein for the reception of bags, resilient bag-supporting means, means for vibrating the said bags, and a folding device, formed in two parts, one of the said parts being adapted to rotate independently of and about the axis of the other part.

In testimony whereof I have signed my name to this specification in the presence of two subscribing witnesses.

WILLIAM ROSE.

Witnesses:
F. W. ROSE,
A. R. ADAMS.